United States Patent
Rothman

[11] 3,903,578
[45] Sept. 9, 1975

[54] COMPOSITE FAN BLADE AND METHOD OF CONSTRUCTION

[75] Inventor: Edward A. Rothman, South Glastonbury, Conn.

[73] Assignee: United Aircraft Corporation, East Hartford, Conn.

[22] Filed: Dec. 13, 1973

[21] Appl. No.: 424,398

Related U.S. Application Data

[62] Division of Ser. No. 229,873, Feb. 28, 1972, Pat. No. 3,799,701.

[52] U.S. Cl. .................. 29/156.8 H; 29/156.8 B
[51] Int. Cl.² ........................................... B21K 3/04
[58] Field of Search ............. 29/156.8 B, 156.8 H; 416/229, 230, 226, 241 A

[56] References Cited
UNITED STATES PATENTS

| 1,530,249 | 3/1925 | Eveleth | 29/156.8 B |
| 2,366,164 | 1/1945 | Weick et al. | 416/229 |
| 2,511,862 | 6/1950 | Martin | 416/226 |
| 3,132,841 | 5/1964 | Wilder | 416/230 |
| 3,600,103 | 8/1971 | Gray | 416/226 |
| 3,628,890 | 12/1971 | Sayre | 416/230 |
| 3,632,460 | 1/1972 | Palfreyman | 416/230 |
| 3,732,031 | 6/1970 | Bowling et al. | 29/156.8 H |

FOREIGN PATENTS OR APPLICATIONS

| 877,664 | 12/1942 | France | 416/226 |

Primary Examiner—C. W. Lanham
Assistant Examiner—Dan C. Crane
Attorney, Agent, or Firm—Norman Friedland

[57] ABSTRACT

A composite fan blade is fabricated by bonding two complementary preformed outer shell halves defining an airfoil planform of composite material sandwiching a metal spar which spar extends beyond the airfoil planform to form the root of the blade.

1 Claim, 3 Drawing Figures

PATENTED SEP 9 1975 3,903,578

COMPOSITE FAN BLADE AND METHOD OF CONSTRUCTION

This is a division of application Ser. No. 229,873, filed Feb. 28, 1972, now U.S. Pat. No. 3,799,701.

BACKGROUND OF THE INVENTION

This invention relates to an improved composite fan blade and particularly to the construction thereof.

Heretofore, a composite blade such as those made from boron epoxy or boron aluminum tapes have been fabricated by building up the airfoil planform by compressing stacked layers of the tapes either with or without a core or spar. Once the planform had been established the entire unit would be set or cured in a well known manner. In the case of boron composite blades, the blade, essentially would be built up of layers of boron composite material in a solid structure and accordingly, in order to meet the structural integrity and obtain the proper airfoil planform would require a large amount of boron material which is extremely expensive.

I have found that I can obtain a structurally sound blade while reducing the amount of expensive composite material such as boron by preforming the shell into two thin halves, preforming the spar and bonding the two halves to the spar in a separate operation. Additionally, by extending the spar beyond the shell I have found that I can form the retention of the blade integrally therewith and enhance the load capabilities of the blade.

SUMMARY OF THE INVENTION

The prime object of this invention is to provide an improved fan blade made from composite material and characterized by being less expensive than heretofore known composite blades.

A still further object is to provide an improved fan blade as described wherein the shell of the blade is fabricated from a composite material and bonded to a centrally disposed spar having an integral retention.

A still further object of this invention is the method of construction of a composite fan blade by preforming two separate halves of an airfoil planform of composite material and bonding the halves to a centrally disposed spar made from either composite or metallic material.

Other features and advantages will be apparent from the specification and claims and from the accompanying drawings which illustrate an embodiment of the invention.

DESCRIPTION OF THE PREFERRED EMBODIMENT

Figure 1:
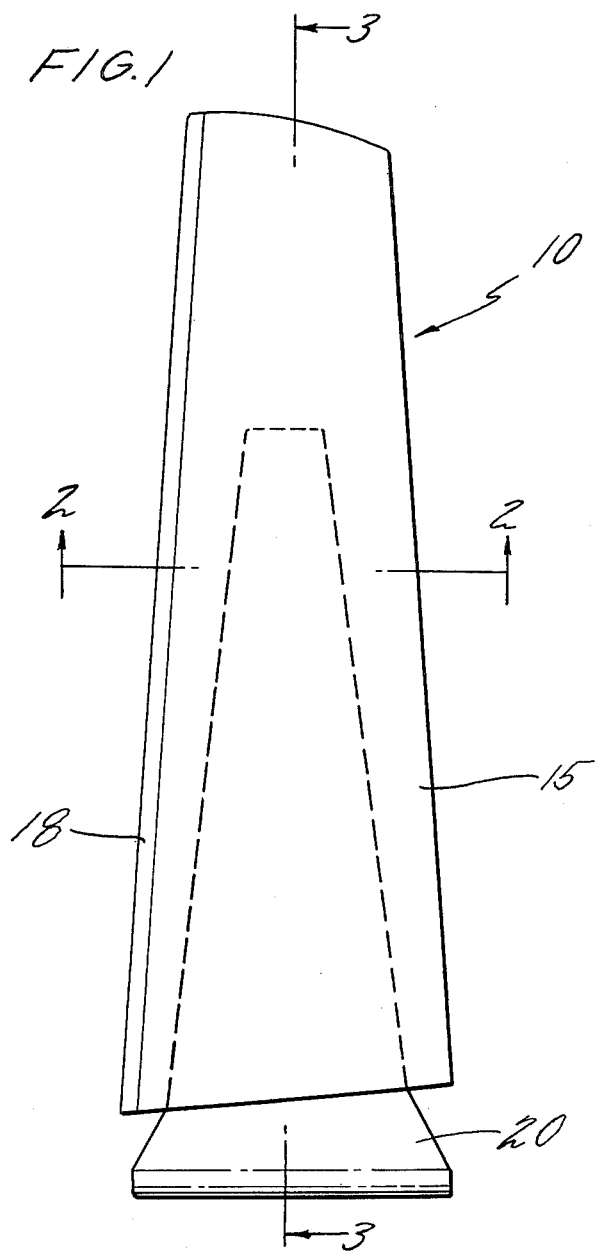
FIG. 1 is an elevated view of a fan blade.
Figure 3:
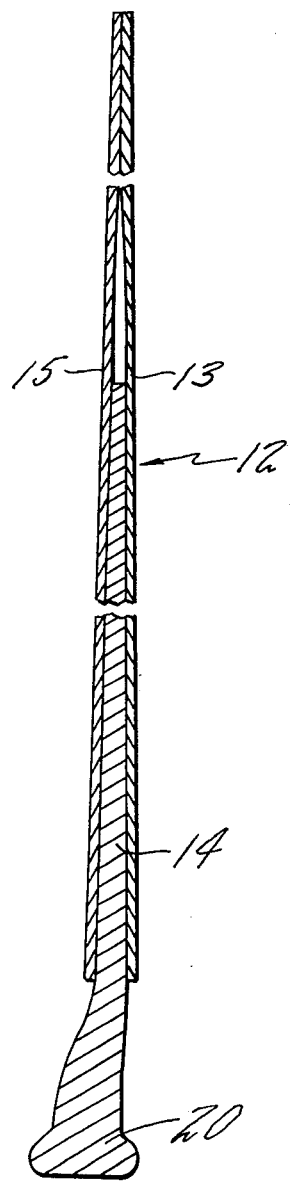
FIG. 3 is an enlarged sectional view taken along lines 3—3 of FIG. 1.
Figure 2:
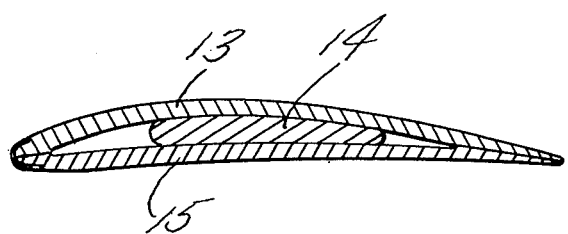
FIG. 2 is an enlarged sectional view taken along the lines 2—2 of FIG. 1.

Referring to FIGS. 1 to 3 the invention shown is a fan blade generally illustrated by numeral 10 and is intended for use in a jet engine as a compressor, or fan or prop-fan blades. The outer shell 12 is fabricated from a composite material such as boron epoxy or boron-aluminum in the manner to be described hereinbelow. It is to be understood that although in its preferred embodiment boron composite material is utilized for the shell any of the other composite material having a high tensile modulus say in the range over 20 million psi Young's tensile modulus of elasticity such as carbon is contemplated within the scope of this invention. The airfoil planform is made into two separate halves 13 and 15 by any well known method as for example the method described in U.S. Pat. No. 3,600,103 granted to D. F. Gray, C. E. Doughty and F. D. Pinney on Aug. 17, 1971 and assigned to the same assignee, and for further details reference should be made thereto.

Once the two halves are preformed into the desired airfoil planform they are bonded together and to a centrally disposed spar 14 preferably made from titanium but not limited thereto. The bonding may be either done by using a suitable adhesive or by any well known brazing or diffusion bonding techniques.

A metal strip 18 may be disposed along the leading edge to protect the edge against damage and erosion. The trailing edge and tip may be likewise treated.

It is an important aspect of this invention that the spar extend beyond the airfoil planform or shell to define a retention portion 20 for securing the blade to the disc or hub (neither being shown) of the rotating assembly.

The two halves of the shell are designed to use the least amount of boron composite material as is necessary to obtain the stiffness for the particular intended use. It is not necessary that the two halves be continuous over the entire mating surface as it is contemplated that the shell may be hollow over some portion thereof, as shown in the FIGS. 2 and 3.

Since the major load carrying member is the spar which transmits the load directly to the disc or hub rather than having the shell carry the load as is the case in heretofore known composite blade assemblies, a lesser amount of boron material is needed resulting in a considerable savings in cost.

It should be understood that the invention is not limited to the particular embodiments shown and described herein, but that various changes and modifications may be made without departing from the spirit or scope of this novel concept as defined by the following claims.

I claim:

1. The method of fabricating a fan blade for a propulsor driven by a turbine type power plant which blade has a relatively large solidity factor comprising the steps of preforming from tapes of relatively high modulus filamentary reinforced composite material by laying presized tapes in a predetermined manner and compressing under controlled pressure and temperature to form separately the camber side and face side, preforming of predetermined size a spar from metallic material, aligning the camber side and face side relative to each other so that their edges overlie and are coextensive and each side is positioned relative to said spar to define a hollow portion adjacent the tip of the spar and tip formed by the junction made between the top edges of the camber and face sides, joining by diffusion bonding, the face side, camber side and spar to each other such that said camber side and space side are joined at their edges and the spar extends centrally between the camber side and space side and projecting therebeyond to define the root section of the fan blade.

* * * * *